Jan. 12, 1960  W. GERMANN  2,920,395
SLIDE CALLIPER
Filed May 14, 1954  2 Sheets-Sheet 1
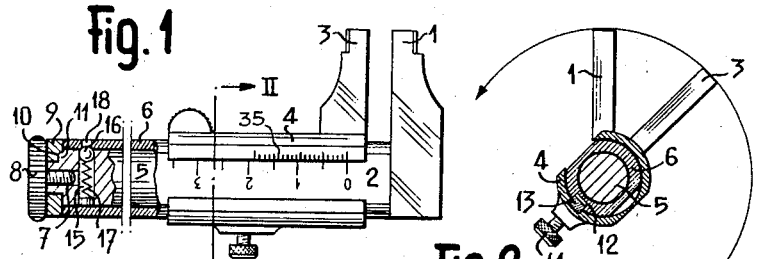
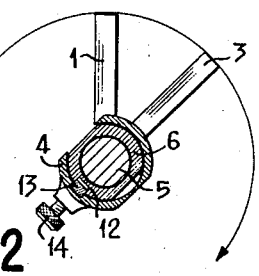
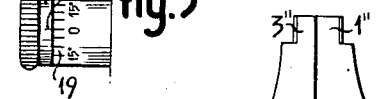
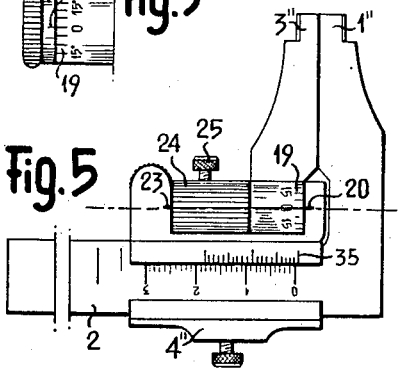
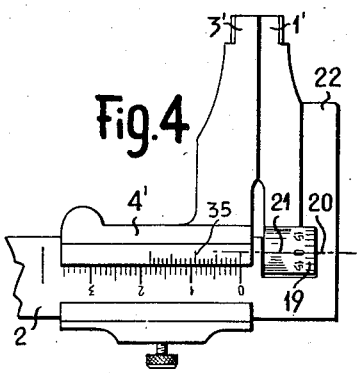
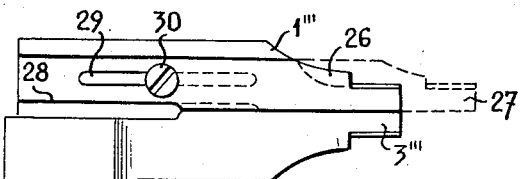
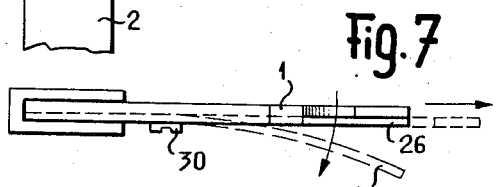
INVENTOR
Werner Germann.
BY
ATTORNEY

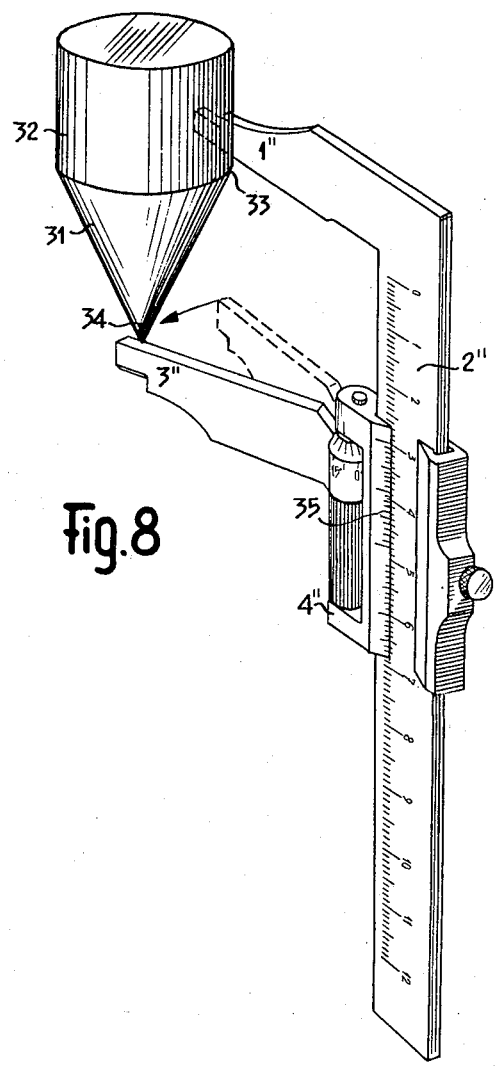

United States Patent Office 2,920,395
Patented Jan. 12, 1960

2,920,395
SLIDE CALLIPER

Werner Germann, Geneva, Switzerland, assignor to Chaskiel Henryk Borzikowski, Boruch Borzikowski, and Ben-Zion Gam, Geneva, Switzerland Application May 14, 1954, Serial No. 429,887

Claims priority, application Switzerland May 16, 1953

3 Claims. (Cl. 33—169)

The present invention relates to a calliper-square for precision measurements which is a measuring instrument of the type comprising two jaws capable of being moved relatively to one another and adapted to measure distances.

Known instruments of this type, for example slide calipers or micrometers, enable the thickness of certain articles or any other measurement of distances, to be measured. However, these known instruments do not permit of measuring with ease certain parts of special shape. For example, it is not possible to measure quickly and with precision, with slide calipers, for example the height of a conical point provided at the end of a cylindrical part.

The instrument according to the invention tends to remedy this disadvantage. It is characterised in that at least a portion of one of the jaws is capable of being directed in a plane different from that in which the other jaw is located, so as to permit of measuring the distance between two planes, even when the marking points of these planes are not located on a line perpendicular to said planes.

A number of forms of construction of an instrument according to the invention are shown diagrammatically and by way of example in the accompanying drawings, wherein:

Fig. 1 is a view in elevation, partly in section, of a measuring instrument according to a first form of construction.

Fig. 2 is a section on the line II—II of Fig. 1.

Fig. 3 is a view of a detail of this first form of construction.

Fig. 4 is a partial view of a second form of construction, and

Fig. 5 is a partial view of a third form of construction.

Fig. 6 is a view in elevation of a fourth form of construction.

Fig. 7 is an end view of Fig. 6.

Fig. 8 shows the method of use of a measuring instrument according to the invention.

The various measuring instruments shown in the drawings are all of the slide caliper type, that is to say that they all comprise a jaw 1, secured to a scale 2, and a jaw 3, secured to a cursor 4, capable of being moved along the scale 2 for displacement angularly in a plane perpendicular to the axes of the scale and cursor.

In the first form of construction shown in Figs. 1 to 3, the scale 2 comprises two parts. One part 5 forms an axle secured rigidly to the jaw 1. The other part is formed by a tubular part 6 rotatable on the said axis 5 in such a manner as to be capable of turning thereon. However, said tubular part 6, which carries graduations, has an axial position fixed relatively to the axle 5 and to the jaw 1. In fact, the axle 5 is provided, at the end thereof remote from carrying the jaw 1, with a threaded bore 7 into which is screwed a screw 8 with a milled head. A washer 9 is fitted on the axis 5, between the screw 8 and the tubular part 6. Said screw 8 thus prevents any axial movement of the tubular part 6 on the axis 5. It is to be observed that the washer 9 is provided with a notch 10 with which engages a projection 11 provided on the axis 5 and which thus prevents the washer 9 from turning on the axis.

The cursor 4 is provided with a circular bore and is capable of sliding on the tubular part 6. However, said cursor 4 is secured angularly to the part 6. In fact, the latter has a longitudinal groove 12 with which engages a key 13 formed by a spring and adapted to eliminate the clearance between the slide and the scale. A screw 14 enables the cursor to be locked relatively to the scale in the known manner by forcing the key 13 against the scale.

Fig. 2 shows clearly how the jaws 1 and 3 of this instrument may be directed in different planes. In fact, as the jaw 1 is secured to the axle 5, which is capable of turning relatively to the part 6, to which the cursor 4 and the jaw 3 are secured angularly, said two jaws 1 and 3 can occupy an infinite number of angular positions relatively to one another.

However, means are provided for maintaining the two jaws 1 and 3 in a stable manner in one and the same plane for measuring ordinary distances. As shown in Fig. 1, said means comprise a hole 15, drilled transversely through the axle 5, said hole having positioned therein a ball 16, urged in one direction by a spring 17. The tubular part 6 has an orifice 18 which, when it is opposite the hole 15, serves as a partial seating for the ball 16 which engages therewith under the action of the spring 17. The engagement of the ball 16 with the orifice 18 determines the angular stable position of the two jaws 1 and 3 corresponding with the coincidence of their two planes.

It will be understood that a number of orifices 18 may be provided radially in the tubular part 6 for determining various given angular positions of the jaws 1 and 3 relatively to one another.

Further, it is to be observed that the tubular part 6 carries a scale 19 (see Fig. 3). The washer 9, secured to the axis 5, carries a mark 20. Said scale 19 and said mark 20, make it possible to read the value of the angle formed between the two planes which each contain a jaw 1, 3 respectively.

In the second form of construction, shown in Fig. 4, the jaw 1', secured to the scale 2, is hinged to this about an axis 21. The cursor 4' carrying the jaw 3' is of known type.

It is to be observed that, in order to ensure greater precision of the instrument, the scale 2 is secured to an extension 22, against which bears the pivoted jaw 1'.

As in the first form of construction, this construction permits of directing the jaw 1' in a plane different from that in which is located the jaw 3' secured to the slide.

Further, the part of the jaw 1', adjacent its hinge point to the scale, is also provided with graduations permitting of reading off, relatively to a mark 20, the value of the angle formed between the two jaws 1' and 3'.

The third form of construction, shown in Fig. 5, comprises a jaw 1", secured rigidly to the scale 2, as in slide calipers of known construction. The cursor 4" is also similar to a slide of known construction. However, the jaw 3" is hinged to the cursor 4" on an axis 23 parallel to the scale 2. The jaw 3" is secured to a milled roller 24 enabling the jaw 3" to be directed in a plane different from that in which is located the jaw 1" secured to the scale 2. A scale 19 is also shown on the part of the jaw 3", adjacent its hinge, to enable reading off, opposite a mark 20 on the cursor, the value of the angle included between the two jaws 1" and 3". To facilitate this type of use the jaws 1″ and 3″ have broad flat faces extending parallel to the scale 2.

It is to be observed that a screw 25 is provided for enabling the jaw 3″ to be locked in a determined angular position relatively to the cursor 4″.

In the last form of construction shown in Figs. 6 and 7, the jaw 1‴ of the slide calipers comprises a part formed by a resilient blade 26, of which the end 27 is capable of being directed in a plane different from that in which the other jaw 3‴ is located.

In the construction illustrated, the resilient blade 26 is capable of sliding axially on a slide 28 provided on a rigid portion of the jaw 1‴. Said blade 26 is provided with a longitudinal slot 29 through which passes a screw 30 holding the blade 26 on the slide 28, whilst allowing it to be moved axially.

This last form of construction thus enables a part 26 of the jaw 1‴ to be directed, not only in a plane different from that in which the jaw 3‴ is located, but also to extend the jaw 1‴ perpendicularly to the scale 2.

Fig. 8 shows clearly how the measuring instrument described above is used. This Fig. 8 shows the position which the measuring instrument must occupy when it is desired to ascertain the height of a conical point 31 forming the end of a cylindrical part 32. As shown in this figure, the flat face of jaw 1″ is brought opposite the base 33 of the cone, that is to say against the side of the cylindrical part 32, whilst the jaw 3″ is moved angularly relatively to the jaw 11″, so as to bear against the point 34 of the cone 31. It is then possible to read off, opposite the vernier 35 of the cursor 4‴, on the scale 2 the required distance. The flat face of jaw 1″ is broad enough to effectively align the calliper for this offset-type of measurement.

It will be understood that a measuring instrument of this character may be utilised in various fields, for example for ascertaining the distance between two grooves or two shoulders with which a shaft is provided.

I claim:

1. A slide calliper for making precision measurements comprising, in combination, a graduated scale, a cursor slidably positioned on said scale, said cursor having an edge portion facing said scale and parallel thereto, a vernier scale on said edge portion facing said scale, a first jaw member, a second jaw member, said jaw members adapted to confront and be coplanar with each other, each of said graduated scale and of said cursor constituting a support means for supporting one of said jaw members at the end thereof and perpendicularly thereto, one of said jaw members being integral with and rigidly fixed to its support means and perpendicular thereto, and the other of said jaw members being angularly, perpendicularly displaceably attached to its support means, each of said jaws having a broad flat face extending in the direction of said graduated scale, whereby the said angularly, perpendicularly displaceable jaw can be positioned in a plane different from the plane of said jaw integral with and rigidly fixed to its support means and at a substantial angle to the plane of said integral jaw, thereby permitting the accurate and precise measurement of the axial distance between the points of an object although said points are not positioned on the same axis of the object.

2. A slide calliper for making precision measurements comprising, in combination, a graduated scale, a cursor slidably positioned on said scale, said cursor having an edge portion facing said scale and parallel thereto, a vernier scale on said edge portion facing said scale, a first jaw member and a second jaw member, said first jaw member being integral with and rigidly fixed to said graduated scale and perpendicular thereto, said second jaw member being perpendicular to said cursor and said scale and angularly, perpendicularly displaceably attached to said cursor, each of said jaws having a broad flat face extending in the direction of said graduated scale, said jaw members adapted to confront and be coplanar with each other, whereby said angularly, perpendicularly displaceable second jaw member can be positioned in a plane different from the plane of said first jaw integral with and rigidly fixed to said graduated scale and at a substantial angle to the plane of said integral jaw, thereby permitting the accurate and precise measurement of the axial distance between the points of an object although said points are not positioned on the same axis of the object.

3. A slide calliper for making precision measurements comprising, in combination, a graduated scale, a cursor slidably positioned on said scale, said cursor having an edge portion facing said scale and parallel thereto, a vernier scale on said edge portion facing said scale, a first jaw member and a second jaw member, said first jaw member being integral with and rigidly fixed to said graduated scale and perpendicular thereto, said second jaw member being integral with said cursor and perpendicular thereto and angularly, perpendicularly displaceably attached to said cursor, said jaw members adapted to confront and be coplanar with each other and having broad flat faces extending in the direction of said graduated scale, said second jaw member having attached thereto at its bottom portion an angular scale, said cursor having positioned thereon an index mark in cooperating relationship with said angular scale, whereby said angularly, perpendicularly displaceable second jaw member can be positioned in a plane different from the plane of said first jaw member integral with and rigidly fixed to said graduated scale and at a substantial angle to the plane of said integral jaw and whereby the angle formed between the respective planes on which said jaw members are positioned can be accurately determined, thereby permitting the accurate and precise measurement of the axial distance between the points of an object although said points are not positioned on the same axis of the object and the accurate and precise measurement of the angle through which said angularly, perpendicularly displaceably attached second jaw moves with respect to said first jaw member integral with and rigidly fixed to said graduated scale and at a substantial angle thereto.

References Cited in the file of this patent

UNITED STATES PATENTS

| 1,655,239 | Priputnevich | Jan. 3, 1928 |
| 2,512,042 | Stern | June 20, 1950 |
| 2,589,904 | Vladeff | Mar. 18, 1952 |

FOREIGN PATENTS

| 12,106 | Great Britain | May 24, 1906 |
| 91,605 | Switzerland | Nov. 16, 1921 |